United States Patent
Milenova et al.

(10) Patent No.: US 9,110,949 B2
(45) Date of Patent: Aug. 18, 2015

(54) GENERATING ESTIMATES FOR QUERY OPTIMIZATION

(71) Applicant: Oracle International Corporation, Redwood Shores, CA (US)

(72) Inventors: Boriana Lubomirova Milenova, Reading, MA (US); Marcos M Campos, La Jolla, CA (US)

(73) Assignee: Oracle International Corporation, Redwood Shores, CA (US)

(*) Notice: Subject to any disclaimer, the term of this patent is extended or adjusted under 35 U.S.C. 154(b) by 37 days.

(21) Appl. No.: 13/764,621

(22) Filed: Feb. 11, 2013

(65) Prior Publication Data

US 2014/0229464 A1    Aug. 14, 2014

(51) Int. Cl.
    *G06F 17/30*    (2006.01)
(52) U.S. Cl.
    CPC ................... *G06F 17/30477* (2013.01)
(58) Field of Classification Search
    CPC .................................. G06F 17/30477
    USPC ......................................... 707/718
    See application file for complete search history.

(56) References Cited

U.S. PATENT DOCUMENTS

| | | | | |
|---|---|---|---|---|
| 5,761,653 | A * | 6/1998 | Schiefer et al. | 707/713 |
| 5,857,180 | A * | 1/1999 | Hallmark et al. | 1/1 |
| 6,092,062 | A * | 7/2000 | Lohman et al. | 1/1 |
| 6,353,818 | B1 * | 3/2002 | Carino, Jr. | 1/1 |
| 6,353,826 | B1 * | 3/2002 | Seputis | 1/1 |
| 6,356,889 | B1 * | 3/2002 | Lohman et al. | 1/1 |
| 6,493,637 | B1 | 12/2002 | Steeg | |
| 6,618,719 | B1 * | 9/2003 | Andrei | 1/1 |
| 7,167,848 | B2 * | 1/2007 | Boukouvalas et al. | 706/14 |
| 7,480,663 | B2 * | 1/2009 | Colossi et al. | 1/1 |
| 7,647,293 | B2 | 1/2010 | Brown et al. | |
| 7,877,381 | B2 * | 1/2011 | Ewen et al. | 707/719 |
| 8,818,991 | B2 * | 8/2014 | Hagenbuch et al. | 707/718 |
| 2003/0065648 | A1 * | 4/2003 | Driesch et al. | 707/2 |
| 2005/0102325 | A1 | 5/2005 | Gould et al. | |
| 2005/0278355 | A1 | 12/2005 | Gonzalez | |
| 2008/0133454 | A1 | 6/2008 | Markl et al. | |
| 2011/0153623 | A1 | 6/2011 | Vo | |
| 2012/0310874 | A1 | 12/2012 | Dantressangle et al. | |
| 2014/0229482 | A1 | 8/2014 | Milenova et al. | |

OTHER PUBLICATIONS

Antoshenkov, Gennady, et al., "Query Processing in Oracle Rdb", The VLDB Journal, vol. 5, Issue 4, Dec. 1996, pp. 229-237.*

(Continued)

*Primary Examiner* — Robert Stevens
(74) *Attorney, Agent, or Firm* — Hickman Palermo Becker Bingham LLP (57) ABSTRACT

Processes, machines, and stored machine instructions are provided for estimating how many rows would be processed by a query. In one embodiment, model aggregating logic may generate a global model based on separate models for separate portions of a set of data. For example, the separate portions may be assigned to separate partitions of the set of data based at least in part on key values in the separate portions. Generating the global model may include generating an uncompressed model that includes components of the separate models before generating a compressed model to estimate the uncompressed model. Query analysis logic may use the global model to estimate how many rows would be processed by queries that, when executed, would access portion(s) of the set of data.

24 Claims, 3 Drawing Sheets

(56) References Cited

OTHER PUBLICATIONS

Aboulnaga, A., et al., "Automated Statistics Collection in DB2 UDB", Proc. of the 30th VLDB Conf., Toronto, Canada, © 2004, pp. 1158-1169.*

Li, Quanzhong, et al., "Adaptively Reordering Joins during Query Execution", ICDE 2007, Istanbul, Turkey, Apr. 15-20, 2007, pp. 26-35.*

Bohm et al., "Selectivity Estimation of High Dimensional Window Queries Via Clustering", dated 2005, 18 pages.

Markl et al., "Consistent Selectivity Estimation Via Maximum Entropy", dated Jan. 15, 2006, 22 pages.

Pavlov et al., "Beyond Independence: Probabilistic Models for Query Approximation on Binary Transaction Data", dated Nov.-Dec. 2003, 24 pages.

Tatti, Nikolaj, "Maximum Entropy Based Significance of Itemsets", ICDM dated 2007, Omaha, NE, dated Oct. 28-31, 2007, pp. 312-321.

Merriam-Webster's Collegiate Dictionary, 10th Edition, Springfield, MA, dated 1997, pp. 308-309 and 918.

Iiyas, Ihab F., et al., "CORDS: Automatic Discovery of Correlations and soft Functional Dependencies", SIGMOD dated 2004, Paris, France, Jun. 13-18, 2004, pp. 647-658.

Fan, Wenfei, et al., "Discovering Conditional Functional Dependencies", IEEE Transactions on Knowledge and Data Engineering, vol. 23, No. 5, dated May 2011, pp. 683-698.

Cimiano, Philipp, "Chapter 6: Concept Hierarchy Induction", Ontology Learning and Population from Text: Algorithms. Evaluation and Applications, Springer, dated 2006, pp. 85-184.

\* cited by examiner

GENERATING ESTIMATES FOR QUERY OPTIMIZATION

CROSS-REFERENCE TO RELATED APPLICATIONS

This application is related to the patent application having Ser. No. 13/764,658, also filed on Feb. 11, 2013, the entire contents of which is hereby incorporated by reference as if fully set forth herein. This application is also related to the patent application having Ser. No. 13/764,677, also filed on Feb. 11, 2013, the entire contents of which is hereby incorporated by reference as if fully set forth herein.

FIELD OF THE INVENTION

The present invention relates to estimating how many rows would be processed by a query.

BACKGROUND

Many businesses live or die based on the efficiency and accuracy by which they can store, retrieve, process, and/or analyze data. "Data," as used herein, is digital information that is electronically stored on storage device(s). Data may be maintained on an individual storage device, such as a local hard disk or solid state drive, a CD-ROM, or a memory module. Alternatively, data may be distributed over multiple storage devices, such as storage devices that are working together to provide a cloud storage service or storage devices that are operating separately to store subsets of the data. One or more database servers may operate in parallel to provide read and/or write access to the data. Large sets of data, whether stored on one device or distributed among many devices, may consume a significant amount of storage space and/or processor time to store, retrieve, process, and/or analyze.

Data may be described in terms of fields and values. "Fields," as used herein, refer to containers or labels that provide contexts. "Values," as used herein, refer to information that is stored according to or in association with the contexts. For example, a single table may have many different columns that provide contexts for the values that are stored in the columns. The different columns may store different sets of data having different contexts, and the different sets of data may or may not be of different data types. In another example, a single document may have many attributes and/or elements that provide contexts for the values that are nested in the attributes and/or elements. Elements or attributes that share the same name, path, or other context may collectively store a set of data that shares the context. Different elements or attributes may store different sets of data having different contexts, and the different sets of data may or may not be of different data types.

To alleviate some of the overhead for storing, retrieving, processing, and/or analyzing large sets of data, some computer systems utilize metadata that is created and stored in association with the sets of data. "Metadata," as used herein, is data that describes other data. Metadata may describe data in a manner that allows the described data to be stored, retrieved, processed, and/or analyzed more efficiently or more accurately. For example, metadata for a given set of data may include a mean, median, mode, minimum, and/or maximum of the given set of data, such that these value(s) may be quickly retrieved without being recalculated each time the set of data is accessed. The metadata may be used to plan for data processing such that a data processor can effectively allocate resources for the data processing.

General statistics such as the mean, median, mode, minimum, or maximum value(s) may be helpful when storing, retrieving, processing, and/or analyzing a set of data. However, these general statistics are not always helpful for predicting whether a non-uniform set of data has specific values.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Various example machine-implemented methods, specially configured machines, and stored machine instructions are provided herein for estimating how many rows would be processed by a query. Machines may be specially configured with logic comprising a combination of stored instructions, hard-wired instructions, and hardware including a processor for performing processes that include estimating how many rows would be processed by a query. In one embodiment, model aggregating logic may generate a global model based on separate models for separate portions of a set of data. For example, the separate portions may be assigned to separate partitions of the set of data based at least in part on key values in the separate portions. Generating the global model may include generating an uncompressed model that includes components of the separate models before generating a compressed model to estimate the uncompressed model. Query analysis logic may use the global model to estimate how many rows would be processed by queries that, when executed, would access portion(s) of the set of data.

As used herein, the term "query" refers to any expression, structure, sub-expression, or sub-structure, that, when executed, causes operation(s) to be performed against data. Example queries include read-only queries that merely select or arrange data, or queries for modifying data. For example, structured query language ("SQL") queries may be executed to access or modify data in a database. SQL expressions that merely include select commands are considered to be read-only queries, and SQL expressions that include insert, update, or delete commands are considered to be a part of SQL's data manipulation language ("DML") for modifying data. All of these types of expressions are considered queries that can be optimized according to the techniques described herein.

Recommendations, directives, or hints as to how a query should be executed by an execution engine, when multiple such ways are possible, are referred to as "execution plans." For example, a single expression may include one or several high-level commands that, when executed by an execution engine, could cause alternative but equivalent operations to be performed against the data. In a simple example, selecting, from an employees table, all employees with a salary of over $50,000 and annual sales of less than $200,000 may be executed by first filtering out employees that make under $50,000 and then filtering out the remaining employees with annual sales of greater than or equal to $200,000. Alternatively, the same query may be executed by first filtering out employees with annual sales of greater than or equal to $200,000 and then filtering out employees that make under $50,000. These two techniques of executing the same query to achieve equivalent results may be called execution plans.

Because the term "query" also refers to sub-expressions or sub-structures, execution plans similarly can be provided for different portions of a larger query. For example, a single query may include multiple sub-queries, and any of these sub-queries may have a separate execution plan. A query optimizer may select any one or multiples of these separate execution plans for separate sub-queries based on a density model. Alternatively, the query optimizer may select an overall execution plan for the entire query, including all sub-queries, based on a density model.

In one embodiment, query analysis logic estimates a number of rows that would be processed by execution plan(s) for a query based at least in part on a global density model that approximates a weighted combination of at least a first density model for a first portion of a set of data and a second density model for a second portion of the set of data. In one example, to estimate the number of rows, the query analysis logic uses the global density model to estimate how many rows contain values that would be filtered out by query predicate(s) in a received query. The query predicate(s), when executed, may filter out rows based on values specified in the query predicate(s). In the same or a different example, the query analysis logic uses the global density model to estimate how many rows contain values that would be included by query selection(s) in a received query. The query selection(s), when executed, may select values for particular columns that are specified in the query selection(s). Based at least in part on the estimated number of rows, the query analysis logic selects an execution plan for the query.

In one embodiment, the query analysis logic evaluates queries that relate to different partitions of the set of data. The query analysis logic has access to the global density model but might not have access to the different partitions or the individual density models. The separate portions represented by the separate density models may be assigned to separate partitions of the set of data based on separate key values of the separate portions. In various other embodiments, the different portions may be any separately defined subsets of the data that have been separately modeled.

As the query analysis logic analyzes queries, the query analysis logic may detect that a given query, if executed, would access variable(s) from multiple separate portions or partitions. In response to detecting that the analyzed query would access variable(s) from multiple separate partitions, the query analysis logic may make predictions about the analyzed query using a global model that approximates densities for the multiple separate partitions. On the other hand, if the query only accesses data from one portion or partition, then the query analysis logic may make predictions about the analyzed query using a model that approximates value densities for the one portion or partition. In one example, if the query analysis logic determines that a second query, if executed, would access one or more rows from a first portion but not a second portion, the query analysis logic may estimate a number of rows that would be processed by execution plan(s) for the second query based at least in part on the first density model but not the second density model and not a global model. The query analysis logic may also select an execution plan for the second query based at least in part on the estimated number of rows.

Figure 1:
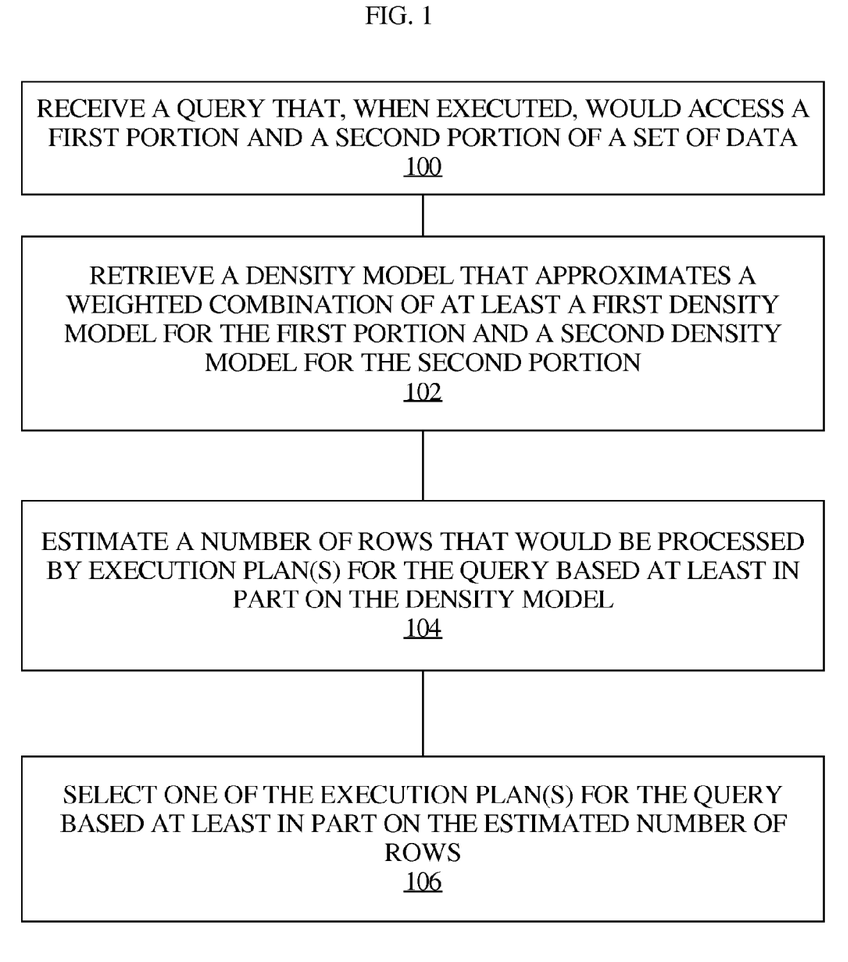
FIG. 1 illustrates an example process for selecting an execution plan at least in part by estimating row cardinality for the execution plan.

FIG. 1 illustrates an example process for selecting an execution plan at least in part by estimating row cardinality for the execution plan. The illustrated process may be performed by query analysis logic operating on one or more computing devices. In step 100, the query analysis logic receives a query that, when executed, would access a first portion and a second portion of a set of data. The query analysis logic then retrieves, in step 102, a density model that approximates a weighted combination of at least a first density model for the first portion and a second density model for the second portion. In step 104, the query analysis logic estimates a number of rows that would be processed by execution plan(s) for the query, or a row cardinality of the execution plan(s), based at least in part on the density model. Finally, in step 106, the query analysis logic selects one of the execution plan(s) for the query based at least in part on the estimated number of rows.

Figure 2:
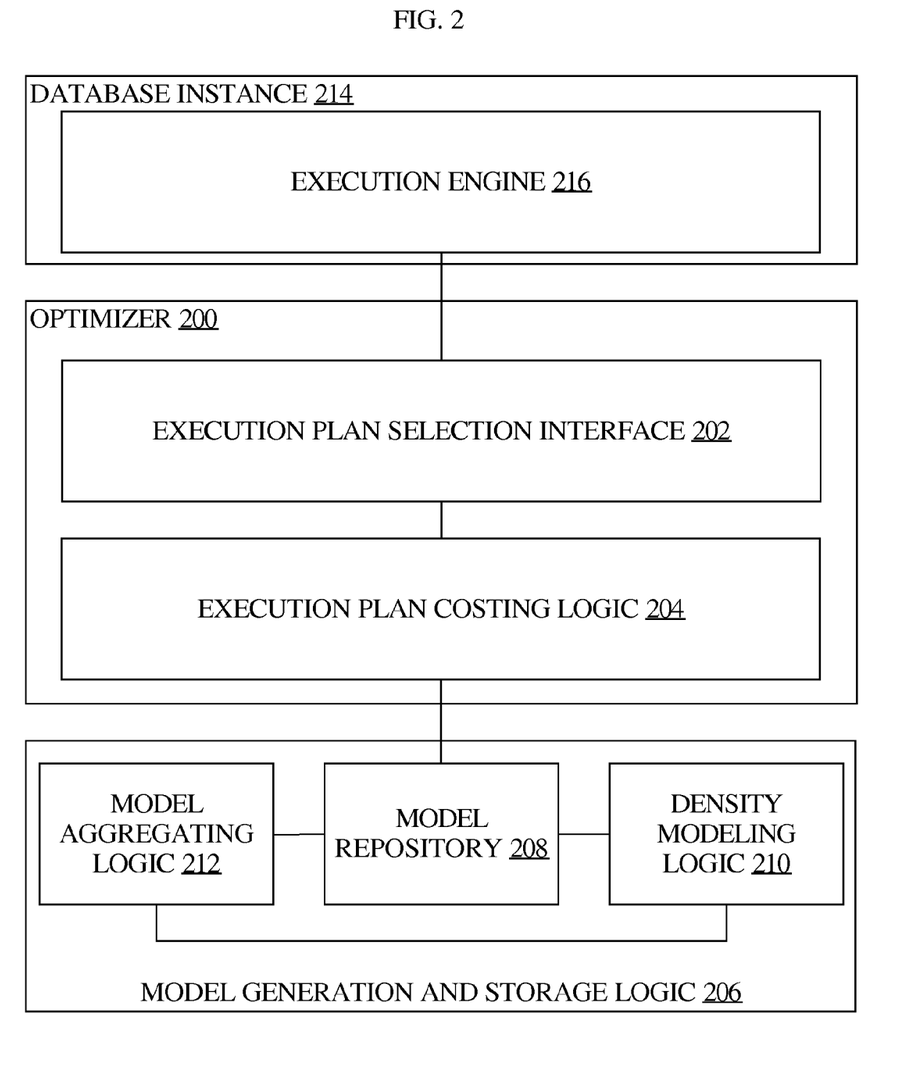
FIG. 2 illustrates an example system for selecting an execution plan for execution based at least in part on stored density models.

FIG. 2 illustrates an example system for selecting an execution plan for execution based at least in part on stored density models. The system includes a database instance 214 having an execution engine 216 for executing queries according to execution plans. The system also includes an optimizer 200 having an execution plan selection interface 202 and execution plan costing logic 204. Execution plan selection interface 202 may receive queries from a client, application, or server, and recommend execution plans for executing those queries. If multiple execution plans are possible for a given query, execution plan costing logic 204 may rank execution plans according to their expected costs in terms of processor time and/or memory consumption.

In order to predict costs for different execution plans, execution plan costing logic 204 accesses density models from model repository 208 of model generation and storage logic 206. The density models provide approximations of frequently certain values occur in data sets. In one example, execution plan costing logic 204 may use a density model from model repository 208 to provide a low cost for an execution plan that filters out records having a particular value early in query execution. In the example, execution plan costing logic 204 may determine, from the density model, that the particular value occurs very frequently in the data set. Thus, filtering out records having that value early in query execution may save processor time or consume less memory.

Model generation and storage logic 206 may include density modeling logic 210 for generating separate density models to be stored in model repository 208. Model generation and storage logic 206 may also include model aggregating logic 212 for aggregating separate density models, such as models for different partitions, and storing a compressed or uncompressed aggregated model in model repository 208.

Query Optimization Using Density Models

Density models may be used by query analysis logic such, as a query optimizer, to estimate a number of rows that will be loaded, accessed, retrieved, filtered, sorted, grouped, aggregated, temporarily stored, stored on disk or in a database, or otherwise processed by a query according to different execution plans of the query. Often, queries include multiple parts, many of which may be computed in parallel or in different orders with respect to each other without affecting an outcome of the query. For example, different select statements and different predicates may or may not affect each other. The select statements may select data from different columns in different tables, and may include predicates that filter out rows that contain or do not contain particular values in those columns. Predicates may also be used to group or order rows according to certain values.

Also, different parts of the query may reference same data. Data that is used by different parts of the query may be loaded once at the beginning of execution of the query and retained for use in executing multiple parts of the query. Loading and retaining such data may require some overhead computation cost that may be overcome if a large portion of the loaded data is accessed multiple times. However, if only small portions of the data are accessed a few times, it may be more expensive to load the entire dataset into memory than to execute each part of the query separately loading the small portions of data separately each time the data is accessed. For example, a query optimizer may recommend against loading an entire table if the query only requests a few number of rows from the table.

Query optimizers are relied upon by query execution engines to accurately predict numbers of rows that would be accessed by different parts of a query. Such predictions may be used to recommend how the query should be executed, and the recommendations, directives, or hints are provided to a query execution engine as an execution plan. For example, the query optimizer may recommend loading an entire dataset into memory if a large portion of the dataset is ultimately used by the query. As another example, the query optimizer may recommend loading a dataset after a few preliminary predicates have been applied to filter down the dataset but before all of the predicates have been applied to generate the result set. The query optimizer offers an improved speed in query execution as long as the optimization process takes less time than the amount of improvement in execution speed over default execution plans. For this reason, decisions about which execution plans to recommend should be made quickly within the time constraints of a query optimizer.

In one example, to estimate a number of rows that will be accessed by a query or a portion of a query, optionally after the application of predicate(s) included in the query, the query analysis logic uses a global density model. The global density model may indicate, without requiring expensive access to the underlying date, how many rows contain values that would be filtered out by query predicate(s) in a received query and/or how many rows would remain after the filtering action by the query predicate(s). The query predicate(s), when executed, may filter out rows based on values specified in the query predicate(s).

In the same or a different example, the query analysis logic uses the global density model to estimate how many rows contain values that would be included by query selection(s) in a received query. The query selection(s), when executed, may select values for particular columns that are specified in the query selection(s). Queries may include multiple selections, each of which may produce a set of rows to be included in the result set. Based at least in part on the estimated number of rows, the query analysis logic selects an execution plan for the query.

The selected execution plan may be one that is estimated to make best use of pre-loaded data without wasting resources. Execution plans may be rated based at least in part on an amount of processor time and/or memory that the execution plans are predicted to consume during execution. The execution plan with the best use of processor time and/or memory may be selected as the execution plan for the query. In one example, an execution plan that pre-loads a large portion of a dataset that is predicted to be re-used multiple times during execution of the query may be selected.

In another embodiment, the query optimizer may select an execution plan that applies a highly filtering predicate very early during execution. For example, based on the global density model, the query optimizer may determine that some predicates filter out a greater number of records than other predicates. As a result, the query optimizer may select those plans that filter out results early during the execution process rather than requiring the processing and storage of records that ultimately will not end up in the result set of the query.

Aggregating Density Models

In one embodiment, the model aggregating logic generates an aggregated density model at least in part by aggregating functional components of other density models. The model aggregating logic may account for weights of the other density models during the aggregation. For example, a first weight of a first model may indicate that the first model represents 5,000 records of data, and a second weight of a second model may indicate that the second model represents 10,000 records of data. When generating the aggregated model, the value densities represented by the second model may be given twice as much weight as the value densities represented by the first model.

In one embodiment, the model aggregating logic generates a compressed model to approximate an uncompressed aggregated model. The uncompressed model may be discarded or retained once the compressed model has been generated. Either the uncompressed model or the compressed model may be used to analyze queries. In one example, the compressed model is generated at least in part by determining an initial set of one or a few functional components for the compressed density model. The compressed density model includes fewer components than the uncompressed density model. The compressed density model may be iteratively grown to better approximate the uncompressed density model at least in part by testing addition(s) of functional component(s) to the initial set of functional components, and determining whether the addition(s) improved an approximation, by the compressed density model, of the uncompressed density model beyond a threshold level. The model aggregating logic may stop growing the compressed density model if increasing the number of components ceases to provide improvement beyond a lower threshold level, if the compressed density model has reached a maximum number of components allowed for compressed density models, or if the compressed density model provides better than an upper threshold level of approximation for the uncompressed density model. In one example involving the upper threshold, the model aggregating logic may stop growing the compressed density model if the model aggregating logic determines, using a score, that the compressed density model lost less than a threshold amount of information when approximating the uncompressed density model.

In one embodiment, after combining multiple density models into a single density model, model aggregation logic stores the single density model in association with the set of data, and, in particular, in association with portions of the set of data that are represented by the single density model. The density model may specify a weight that indicates how many data items are represented by the particular density model.

Such a weight may be used to determine how much to weight the density model if the density model is to be combined with other density models to produce a new global model.

In one embodiment, separate density model(s) are received from separate distributed system(s) that store separate portion(s) of a set of data. The process of aggregating the separate density model(s) and/or compressing an aggregated density model may be performed without accessing any or all of the separate portion(s) of the set of data from the separate system(s).

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Generating a Compressed Density Model from Aggregated Models

In one embodiment, density modeling logic may treat separate density models as separate datasets by scaling normalized distributions represented by the separate density models by weights that represent how much data is represented by the normalized distributions. The density modeling logic may begin with an initial model that includes one or a few components. While generating a compressed density model to approximate the value densities, the density modeling logic selects a functional component of the initial model to vary based at least in part on how much the functional component contributes to how well the initial model approximates the value densities. For example, the functional component may be selected based at least in part on how much the functional component contributes to a likelihood or log likelihood that the values are explained by the first model. The density modeling logic then uses at least the functional component and a variation of the functional component as seed components to determine adjusted functional components of the compressed model by iteratively determining, in an expectation step, how much the seed components contribute to how well the compressed model explains the values, and, in a maximization step, new seed components, optionally to be used in further iterations of expectation maximization, based at least in part on how much of the values are attributable to the seed components. The expectation and maximization steps, when complete, result in new model parameters that allow the model to better explain the data. The improvement of the new model parameters is measured by a higher likelihood. The expectation step may include determining how much the seed components contribute to a likelihood or log likelihood that the values are explained by the compressed model.

The density modeling logic may also determine whether or not to add more components or vary the selected component based at least in part on whether the likelihood or log likelihood that the values are explained by the compressed model is at least a threshold amount better than the likelihood or log likelihood that the values are explained by a previous version of the compressed model. If varying a selected functional component does not provide a significantly better likelihood or log likelihood, then other functional components of the previous version of the compressed model may be selected to vary. Up to a threshold number of other functional components of the previous version of the compressed model may be selected to vary. If none of the threshold number of other functional components improve the likelihood or log likelihood of the compressed model significantly beyond that of the previous version of the compressed model, then the previous version of the compressed model or any of the later versions of the compressed model that were already generated may be used as the final model that represents the set of data.

When evaluating how much the seed components contribute to a likelihood or log likelihood that the values are explained by the compressed model, the likelihood or log likelihood may be evaluated relative how much other functional components contribute to the likelihood or log likelihood that the values are explained by the compressed model, and/or with the assumption that the values are explained by the compressed model. In other words, the likelihood represents (P) a probability of (A) the values being explained by the model given (B) that the model is accurate, or P(A|B).

Density Models

The components of the models may include any functions that may be defined by variable parameters and that may describe distributions of values. For example, continuous functions such as gaussian distribution functions may be used to model continuous data distributions. As another example, discrete functions such as multinomial distribution functions may be used to model discrete data distributions. In one example, the selected functional component is a Gaussian distribution or bell curve centered at a specified value, such as the mean. The specified value may be stored to define the bell curve. The bell curve may also be defined according to a specified width or variance of the bell curve and/or a specified height of the bell curve, if the bell curve is not normalized. The variation of the Gaussian distribution may be generated by varying the location (mean) of a first functional component in a direction of maximum variance. In another example, the selected functional component is a multinomial distribution having one or more frequencies, and a variation of the multinomial distribution may be generated by varying the one or more frequencies.

In one embodiment, the seed components used for producing a new density model also include, in addition to the selected component and the variation of the selected component, other component(s) that are in a same neighborhood as the selected component. For example, the other component(s) may be within a threshold distance of the selected component, or within a distance that is based on the statistical variance of the selected component. In a particular example, other components that are within twice the variance of the selected component may be defined as being in the same neighborhood. In various other examples, components in the same neighborhood are those components with at least a threshold level of or highest ranked levels of overlap in distribution. Such overlaps can be measured for different kinds of distributions and are not necessarily variance-based.

Regardless of whether or not the seed components include other components that are in the same neighborhood as the selected component, the density modeling logic may determine a new set of functional components for a new model at least in part by determining adjusted functional components of the new model. The adjusted components are determined by, in an expectation step, determining how much the seed components contribute to how well the new model approximates the value distributions, and, in a maximization step, determining new seed components based at least in part on how much of at least part of the values are attributable to the seed components. The expectation and maximization steps, when complete, result in new model parameters that allow the model to better explain the data. The improvement of the new model parameters is measured by a higher likelihood.

Preparing Data for Modeling

The density modeling logic may be implemented such that different operations are performed using separate specialized software and/or hardware. The different operations may be performed concurrently or in parallel on different portions of the data and, if the operations are dependent on each other, sequentially on same portions of the data. For example, the density modeling logic may include a first set of density modeling logic that operates in parallel with a second set of density modeling logic. In an initial data scan, the first set of density modeling logic, which may be distributed over a number of slaves, may record the minimum and maximum values observed for all numerical attributes (including, for example, 2D data and nested columns) and computes the frequencies of the attribute name and value combinations of all categorical attributes (including, for example, 2D data and nested columns). Multidimensional data such as two-dimensional ("2D") data (referring to two or more columns of a table) includes multiple variables and may be stored as an array, series or collection of data. For example, multidimensional data may be stored in a nested column where each row includes a collection of values such as (name, value) pairs.

The minimum and maximum numerical attributes values, categorical frequencies, and number of rows in the first set may be passed on to a second set of density modeling logic, which may be hosted on same or different devices as the first set. Data may be hashed in the second set, and the minimum and maximum numerical values and categorical frequencies are aggregated. The minimum and maximum values may be used to compute equi-width histograms in final cluster statistics. The aggregated categorical frequencies may be used to identify the top-N bins for each categorical attribute. In the process of aggregation, nested column attribute lists may also be consolidated.

Bin boundaries may be computed for each column. Columns with intrinsic order (e.g., NUMBER, DATE) may be handled by sorting the values and finding appropriate cut points. The bin boundaries may not be strictly quantile in the cases when the data distribution and/or the number of unique values do not allow precise quantization. Columns without intrinsic order (e.g., CHAR, NCHAR) may use top-N binning. Univariate column histograms may also produced in the bin boundary computation step.

In one embodiment, data is loaded by scanning a data table, binning the data on the fly, and storing the binned data in memory. The binned data may then be used to compute bivariate histograms for each column pair or to generate models. Attribute similarity computations may be made based on the univariate and bivariate histograms. For each pair of attributes, the observed bivariate histogram is compared to an estimate, using the corresponding univariate histograms, based on the assumption that the variables are independent. The pair-wise similarity estimates may then be used to produce a global attribute similarity ranking.

The second set of density modeling logic may communicate back, to the first set of density modeling logic, the minimum and maximum numerical values, the top-N categorical bins, the number of attributes per nested column, and the total number of rows in the data. The nested column attribute lists are stored in the second set. This information may be used during the model output stage. The nested attribute lists may be communicated back to the first set if there are too few nested attributes in a column to carry out meaningful projections. In this case, the nested attribute lists may be used to create consistent mappings of subnames (and values) to attribute ids.

Once the total number of rows is known, the first set of density modeling logic may draw a small random sample of the 2D data (for example, approximately 2000 rows). The sampling is repeatable in the presence of a user provided row identifier (case id). In the process of sampling, the 2D categorical columns are binned using the top-N bin definitions generated during the previous step.

In the second set of density modeling logic, the 2D data sample is used to perform attribute similarity analysis. During the attribute similarity analysis, the second set of density modeling logic may compute quantile bin boundaries for the numerical columns and/or univariate histograms for the data columns.

After binning the sample data, the density modeling logic computes bivariate histograms for each attribute pair and Kullback-Leibler divergence ("KLD") distances between the bivariate histograms and the distribution produced by the univariate histograms under an assumption that the univariate histograms are independent. The KLD score measures an amount of information that is lost when one field is used to approximate another field. If the amount of lost information is below a threshold for two fields, then the fields may be grouped together as interdependent. On the other hand, if the amount of lost information is above a threshold for two fields, then the fields are not grouped together as interdependent. Pair-wise KLD distances form a similarity matrix, and the density modeling logic may compute a rank-weighted similarity row average for each attribute. This quantity may be used as a measure of global similarity. In one embodiment, only attributes that are significantly correlated are used during a subsequent EM model build. The user can further restrict the attribute space to the N most correlated attributes according to a setting on the density modeling interface.

The data sample may help the density modeling logic determine what type of distribution is most appropriate for modeling each numerical column (Gaussian or multivalued Bernoulli on quantized data). Attributes, that are modeled using Gaussian distributions, may be normalized when automatic data preparation is turned on. The density modeling logic computes the required shift and scale normalization parameters on the sample.

The second set of density modeling logic may communicate to the first set of density modeling logic the computed normalization parameters and quantile bin boundaries. In one embodiment, only data preparation parameters that were found to be significantly correlated are passed back to the first set of density modeling logic. Passing a subset of the original attributes effectively filters the data. The second set of density modeling logic also send a list of the categorical 2D column ids that were found to be correlated.

The density modeling logic transforms the raw data by either binning or normalizing the correlated 2D columns. Nested columns with large number of attributes may be projected down to lower dimensional spaces. The first set of density modeling logic may use random projections to generate the transformations, optionally independently by each slave in the first set. The transformed data is then stored by the first set of density modeling logic, and the first set of density modeling logic may also randomly partition the data rows into build and held-aside sets if there are a sufficient number of rows. In one embodiment, the density modeling logic uses the last 25% of the records as a held-aside dataset.

Overview of Expectation Maximization

In one embodiment, the density modeling logic grows an expectation maximization model incrementally, starting with a single or a few components. Then, the density modeling logic adds one or a few components at a time and evaluates whether the larger model significantly outperforms the smaller model. New components are initialized to areas with poor distribution fit. The new model is retained only if it has a better held-aside log likelihood, i.e., if the data is better explained by the new model. If the data had too few rows to allow the creation of a held-aside dataset, the density modeling logic may use the Bayesian Information Criterion (BIC criterion) as a measure of quality. If the new model does not outperform the original model, the density modeling logic attempts adding a new component initialized to a different area with poor distribution fit. The search may continue until a sufficient number of failed attempts are made or the model reaches the maximum allowed number of components as specified by the user setting.

Expectation Maximization (EM) is an iterative algorithm that adjusts the model parameters to maximize the likelihood of the build data. The algorithm performs two steps: Expectation (E-step) and Maximization (M-step). The E-step computes probabilistic assignments to model components given the current model. The M-step optimizes the model parameters to improve the likelihood of the build data.

To learn the EM model parameters, the density modeling logic iteratively processes the input data. The data does not need to be randomized or presented in any particular order. Initially, separate models may be built for the group of 2D correlated columns and for each nested column.

Expectation maximization logic iterates over the E-step and the M-step until convergence. The E-step involves scoring each row against the current model, starting with seed components or parameters. The M-step involves computing optimized model parameters based on the E-step assignments. Each slave in the first set of density modeling logic may include expectation maximization logic for performing the E-step and a partial M-step on its set of build rows. The E-step results are also used to compute the log likelihood of the build data. The held-aside rows do not need to be processed and can be skipped at this stage.

After processing all build rows at the slaves, the partial M-step results and the log likelihood on the build data may be passed to the second set of density modeling logic, where the M-step results are aggregated to produce a global model of adjusted components or parameters. The aggregated log likelihood on the build data may be used to determine if the model parameters or the log likelihood of the model parameters has stopped changing significantly and the algorithm has converged.

The second set of density modeling logic communicates the global model to the first set. If the algorithm has not converged, another iteration on the build data may be performed. Once the algorithm converges to adjusted components, a single E-step is performed on the held-aside data rows to compute the log likelihood for the held-aside data rows. For small datasets with no held-aside, the density modeling logic performs this step on the build data and then computes a BIC criterion on the log likelihood of the build data.

The partial log likelihoods on the held-aside data, computed by the first set of density modeling logic, are aggregated to produce the global log likelihood. This global likelihood may be used to determine if the current model has produced a significant improvement over the previous model.

Once the model build is completed, the density modeling logic may next produce attribute statistics for the records assigned to each of the adjusted components. These statistics may be used to generate cluster details for the model viewing stage. Generating these statistics may involve a pass through the transformed data to compute row assignments. Based on the row assignments, attribute statistics are collected from the corresponding rows in the raw data. In parallel execution, this work is performed locally in the first set of density modeling logic and then aggregated in the second set of density modeling logic.

Initial Models

The expectation maximization logic creates initial baseline models at each slave. The initial baseline models may be identical models with one or few component(s). For example, the Gaussian components may be initialized with the means and standard deviations computed from the sample, and the Bernoulli distributions may be initialized with bins of equal probability.

During this initial bootstrapping stage, a log likelihood (or BIC) reference point is created from the initial baseline models. Any more complex model should produce a better likelihood (BIC) than the simplistic one (or few) component(s) baseline.

The E-Step

In the E-step, expectation logic uses the current model parameters to compute probability assignments for each record to the model components. Formally the E-step is given by:

$$p(m \mid x_i, \theta) = \frac{p(m) * p(x_i \mid m, \theta)}{\sum_j p(j) p(x_i \mid j, \theta)}, \quad (1)$$

where m is the index of a model component, $x_i$ is a data record, and $\theta$ is the set of model parameters.

The E-step essentially weighs the probability that the data record $x_i$ was generated by component m, $p(x_i \mid m, \theta)$, by the component prior p(m). This weighted probability is then normalized across all model components.

The computation of $p(x_i \mid m, \theta)$ depends on the types of distribution used to model individual data columns.

If independence is assumed among the attributes, the overall probability of a data record is given by the product of probabilities of individual attributes:

$$p(x_i \mid m, \theta) = \Pi_k p(x_{ik} \mid m, \theta),$$

where k indexes the individual attributes.

The independence assumption holds for attributes modeled by multivalued Bernoulli distributions and Gaussian distributions with diagonal covariance matrices. In the case of multivalued Bernoulli distributions, $p(x_{ik} \mid m, \theta)$ is equal to the probability of the histogram bin that corresponds to the value in the data record.

In the case of Gaussian distributions with diagonal covariance matrices, $p(x_{ik} \mid m, \theta)$ is computed as:

$$p(x_{ik} \mid m, \theta) = \frac{1}{\sqrt{2\pi\sigma_{mk}^2}} \exp\left(-\frac{(x_{ik} - \mu_{mk})^2}{2\sigma_{mk}^2}\right),$$

where $\mu_{mk}$ and $\sigma_{mk}$ are the parameters of the Gaussian distribution of component m and attribute k.

To ensure stable numerical computations and prevent underflows, the probability product is computed as a sum on the log scale. This also avoids the computationally expensive exponentiation operations.

In the case of Gaussian distributions with full covariance matrices, similarities between attributes and $p(x_i|m, \theta)$ may be computed in one step as:

$$p(x_i \mid m, \theta) = \frac{1}{(2\pi)^{k/2}|\Sigma_m|^{1/2}} \exp\left(-\frac{1}{2}(x_i - \mu_m)' \sum_m^{-1} (x_i - \mu_m)\right),$$

where k is the number of attributes, m indexes the components, $\Sigma_m$ is the full covariance matrix of component m, $|\Sigma_m|$ is the determinant, $\Sigma_m^{-1}$ is the inversion, and $\mu_m$ is the mean vector of component m.

If the data has a mix of numerical and categorical attributes, the expectation logic may assume independence between the two groups. Accordingly, $p(xi|m, \theta)$ may be computed separately within each group, and the expectation logic may multiply the results to produce the final probability.

The M-Step

In the M-Step, maximization logic uses the expectation probabilities computed in the E-step to update the EM model parameters. Since the computations may be distributed across slaves, the maximization logic computes partial running sums that can be easily aggregated.

The maximization logic computes partial prior updates, $p(m)^s$ by summing the expectation probabilities for each model component over all data records. The superscript s indicates that the sums are within each slave and i indexes the rows within the slave.

$$p(m)^s = \Sigma_i p(m|x_i, \theta).$$

Updating a histogram bin value in a multivalued Bernoulli distribution includes summing the expectation probabilities over the data records that have that particular bin in the attribute described by the histogram.

$$\beta_{mkn}^s = \Sigma_{i \in x(k)=n} p(m|x_i, \theta),$$

where $\beta_{mkn}$ is the $n^{th}$ bin frequency of the $m^{th}$ component and $k^{th}$ attribute.

In one embodiment, two running sums are maintained to update the parameters of a Gaussian distribution with a diagonal covariance matrix, for each attribute, we maintain two running sums:

$$x_{mk}^s = \Sigma_i p(m|x_i, \theta) * x_{ik}$$

$$(x^2_{mk})^s = \Sigma_i p(m|x_i, \theta) * x_{ik}^2, \tag{2}$$

where m indexes the components, k indexes the attributes, and $x_{ik}$ is the $k^{th}$ attribute value in the $i^{th}$ record.

Both means and the standard deviations may be computed using a single pass through the data using these quantities.

To compute updates for the mean parameters of Gaussian distributions with full covariances, we maintain the running sum in equation (2).

The partial updates of the full covariance matrices include the computation of the following matrix of running sums:

$$\begin{bmatrix} (x_{m1}^2)^s & (x_{m1}x_{m2})^s & \cdots & (x_{m1}x_{mK})^s \\ (x_{m1}x_{m2})^s & (x_{m2}^2)^s & \cdots & (x_{m2}x_{mK})^s \\ \vdots & \vdots & \ddots & \vdots \\ (x_{mK}x_{m1})^s & (x_{mK}x_{m2})^s & \cdots & (x_{mK}^2)^s \end{bmatrix},$$

where m indexes the components, and K is the number of attributes modeled by the Gaussian distribution and an element of the matrix is given by:

$$(x_{mk}x_{mn})^s = \Sigma_i p(m|x_i, \theta) * x_{ik} x_{in},$$

where k and n index two different attributes.

Computing Partial Likelihoods

As the expectation maximization logic computes the E-step probabilities and M-step partial results, the expectation maximization logic also evaluates the log likelihood of the build data. The log likelihood is a summary statistic that quantifies how well the underlying data is modeled by the parametric EM model. The log likelihood is defined as:

$$LL(\theta;x)^s = \Sigma_i p(x_i|\theta) = \Sigma_i \Sigma_m \ln(p(m) * p(x_i|m, \theta)), \tag{3}$$

where i indexes the data rows, m indexes the components, and p(m) is the current model prior.

Monitoring the value of the log likelihood statistic provides one of EM's convergence criteria—if the log likelihood does not significantly improve over an iteration, the algorithm exits the E-step/M-step iterative loop.

Held-aside data does not get processed during the primary E-step and M-step iterations. However, once convergence is achieved, a single E-step through is performed on the held-aside data to compute the log likelihood of the held-aside data. This value is used to independently evaluate the new model quality and prevent overfitting. The computation in equation (3) is used to compute the log likelihood, and the summation goes over the held-aside rows.

In one embodiment, when the expectation maximization logic uses a held-aside validation set to monitor model improvement, rows of the binned data may be hashed to achieve a pseudo-random data split into training and validation data. In one embodiment, for rows that have no unique identifier, to address the possibility of repeated rows, the density modeling logic uses a two-level hashing approach. The first level randomly partitions the data in half. One of the halves is passed through a second hash to split it further into two parts. This results in a training set and a validation set split. Such a hashing approach may be avoided for data that has a unique identifier.

Special treatment may be given to repeated rows in the data. The described two-level hashing may place all identical rows in the same partition. To avoid that scenario, the density modeling logic may keep track of the hash collisions and alternate the partition assignment. A hash table may be maintained for each hash function. The key is the hashed value. To keep track of collisions, the density modeling logic stores an assignment value (0 for training set and 1 for validation set). When a collision occurs, the density modeling logic looks up the last assignment, assigns the row to the other partition, and updates the last assignment value. This results in a random partition of the identical rows between the training and the validation sets.

Finally, the density modeling logic may re-order the 2D pointers to the individual rows in the build data, so that the first of the rows represent the training data and the last of the rows represents the validation data.

When held-aside data does not exist, the expectation maximization logic uses the build data instead. The build data log likelihood may be converted in a BIC score.

The expectation maximization logic also quantifies the contribution of individual components to the global log likelihood. This measure allows the density modeling logic to grow the model in areas of poor fit. The partial contributions of the individual components $Q_m$ are given by:

$$Q_m^s = \Sigma_i p(m) * p(x_i|m, \theta)) * p(m|x_i, \theta) \tag{4}$$

The expectation maximization logic may output the following types of information: partial prior updates; partial multivalued Bernoulli histogram updates; partial Gaussian mean updates; partial Gaussian covariance updates; and partial log likelihood statistics.

Adding Model Components

In one embodiment, density modeling logic aggregates the partial parameter updates and log likelihoods computed by the slaves and guides the EM model search. Guiding the EM model search may include monitoring convergence conditions, evaluating model quality, and adding or rejecting new model components.

A parameter aggregation step may follow each E-step/M-step iteration. In the parameter aggregation step, the sum of partial priors $p(m)^s$ aggregated across priors may be scaled by the total number of records N.

$$p(m)=\Sigma_s p(m)^s/N.$$

The sum of partial bin frequencies $\beta_{mkn}^s$ is scaled by the product of the total number of records and the newly computed component prior.

$$\beta_{mkn}=\Sigma_s \beta_{mkn}^s/(N*p(m)).$$

To avoid ordering the sequence of aggregation, the density modeling logic may initially compute the summation (numerator). Once all aggregations are complete, the density modeling logic may divide by the denominator.

The same staged computation may apply to the Gaussian mean and covariance aggregations.

For Gaussian means, the sum of partial bin frequencies $x_{mk}^s$ is scaled by the product of the total number of records and the newly computed component prior.

$$\mu_{mk}=\Sigma_s x_{mk}^s/(N*p(m))$$

The Gaussian covariance parameters may be computed as:

$$\sigma_{mkn}^2 = \sum_s \frac{(x_{mk}*x_{mn})^s}{N*p(m)} - \mu_{mk}*\mu_{mn},$$

where $(x_{mk}*x_{mn})^s$ is the sum of partial covariances aggregated across slaves and $\mu_{mk}$ and $\mu_{mn}$ are the newly computed means for attributes k and n in component m.

The partial log likelihood sums may be aggregated across slaves. If the change in log likelihood from the previous E-step/M-step iteration is less than 0.001% or some other threshold value, the algorithm has converged. If the number of iterations has exceeded the maximum number of allowed iterations, the algorithm also terminates. If neither convergence criterion has been met, a new E-step/M-step may be initiated.

The EM model may be grown incrementally by adding one or a few component(s) at a time and training the model using the primary EM algorithm. After the algorithm has converged, density modeling logic evaluates if the larger model significantly outperforms the original model. The density modeling logic may keep adding components until either the EM model stops showing improvement or the maximum number of components is reached. The density modeling logic adds new components in areas with poor distribution fit.

The density modeling logic may replace a component with poor fit by two new components. The new components are initialized with the parent distributions with slight perturbation to break the symmetry.

In one embodiment, the density modeling logic monitors the improvement in log likelihood on the held-aside dataset, and the density modeling logic may accept a new model component only if the density modeling logic detects a reasonable improvement in log likelihood. In one embodiment, the improvement must be greater than a threshold value such as 0.1%.

When there are too few rows to perform a split, such as 500 or fewer rows, the density modeling logic may use BIC regularization to penalize the increase in model size:

$$BIC=-2*LL*k*\ln(N),$$

where k is the number of model parameters, and N is the number of rows. A lower BIC value indicates a better model.

In one embodiment, the density modeling logic chooses which component to split into two new components based on its individual contribution to the log likelihood Q, (see equation 4). The component with smallest contribution may be used for the split. If the top choice does not produce an improvement, the next component on the list may be used for splitting. Each component may be visited only once, and components where the split failed are marked as non-splittable. The search for a better model may be limited to a threshold number of bad splits, such as 5, after which the model search terminates.

To facilitate reversal of bad splits, the density modeling logic stores a copy of the previous model. If the new model does not produce an improvement, the new model is discarded and the previous model is restored.

The stored model size may be determined by the number of components (n), number of attributes (m), and the number of bins (k). The attributes can be subdivided into three groups: attributes using multivalued Bernoulli distributions ($m_b$), attributes using Gaussian distributions with diagonal covariance matrices ($m_{gd}$), and attributes using Gaussian distributions with full covariance matrices attributes ($m_{gf}$). The total model size may involve the storage of $n*(1+m_b*k+2*m_{gd}+m_{gf}+m_{gf}*(m_{gf}+1)/2)$ double precision values.

Once the model search is complete, the final or resulting model may be distributed to the slaves, stored, or returned in response to a request for a resulting model for the underlying dataset. The output of this stage is an EM model. This model is either the result of aggregation of the partial M-step parameter updates or is a model with a newly split component.

Merging Models

In one embodiment, model aggregating logic extracts individual model information, reconciles bin boundaries, merges univariate histograms, and lastly performs a model merge. In any stage of the merge, the model aggregating logic may weigh the contributions of the individual models by the partition size that produced them.

In one embodiment, the model aggregating logic merges models in batches of 20 models. Each batch produces a merged model that can be added to the next batch of models for further merging. The partition size of the merged models equal the sum of the partition sizes of the original models.

For each attribute represented by the models, the model aggregating logic makes an ordered list of all distinct bin boundary values across models. The minimum attribute values are also included as potential bin boundaries. These values are potential bin boundaries for the merged histogram. Then for each interval between the bin boundary values, the model aggregation logic estimates a record count. The record count is computed as the sum of expected values for this interval across models. The expected value per model is derived from the univariate histogram for this attribute and is the fraction of the bin count corresponding to the fraction of the original bin covered by the new interval. The model aggregating logic may assume that the data is uniformly distributed inside the bin, so a fraction of the bin interval corresponds to the same fraction of the bin count. Each fraction is weighted by the partition size of the corresponding model. Once the potential bin boundaries are assigned their expected record counts, the model aggregating logic computes a cumulative distribution on these counts.

For each attribute, the model aggregating logic also aggregates the top-N lists from the individual models using a hash table. The model aggregating logic may process one column as a time. After the aggregation, the model aggregating logic may place the aggregated values in an array and sort by frequency. The top-N values may be retained in storage.

A given value may have an individual frequency in some models and may be in the catch-all 'other' bin in other models. Having a larger number of top-N frequencies may avoid this problem. It is also possible to probabilistically assign the 'other' bin to the list of known values that do no belong to the top-N. However, it is unclear if the improvement would warrant the complexity.

Different models may be using different subsets of the attributes. The final merged model exists in a subspace defined by the superset of the attributes found in the individual models. The individual models may be augmented by the additional attributes. This is a simple procedure that may involve adding more histograms to the model component distributions. The model aggregation logic uses the corresponding univariate histograms. For a given attribute, the same univariate histogram is added to each model component.

Once the merged bin boundaries are computed, each underlying model may be adjusted to conform to these boundaries. The bin frequencies are then recomputed. In the quantile case, the model aggregation logic may assume that the data is uniformly distributed within a bin. The original bin counts are distributed to new bins according to the fraction of the old bin interval that falls within the new bin. In the top-N case, the bins that belong to the histogram are retained while the bins that are not present in the new histogram are merged into the 'other' bin.

The EM models are stitched together by appending the components and adjusting the priors (weighted by partition size) to reflect the size of the data seen by each model. The list of original model components represents the new training data. Each original component becomes a data row. In the aggregated data, each attribute in a row may be represented by a histogram instead of a single value.

If there are more than 20 models to be merged, the model aggregation logic may keep track of which components are from the previous batch merges and which are from newly loaded model. The merged model may be placed in the beginning of the buffer.

The model merge task may include reducing the stitched model to a lower number of components. As in the standard EM, the model aggregation logic may use a top-down strategy where the model is grown until the model reaches the maximum allowed size or no significant improvement can be achieved.

In one embodiment, unlike the general expectation maximization routine, the model aggregation logic measures log likelihood improvement on the training data (represented by the stitched model) itself and not on a held-aside set of data. The contribution of each data point (original component) may be weighted by its prior. The model aggregation logic may use log likelihood instead of expected log likelihood to be able to make meaningful comparisons when the model size changes.

In one embodiment, the model aggregation logic does not use a hard assignment strategy. In other words, all data records may be used to update all model parameters.

In one embodiment, the contribution of individual components to the expected log likelihood is measured without taking into account the priors of the reduced model but weighting each point contribution by its original prior:

$$Q_k = \Sigma_n \log(P(n|k)P(n)P(k|n)),$$

where n indexes the old components and k indexes the components of the reduced model.

In one embodiment, in the computation of model likelihood by the model aggregating logic, the stitched model histograms and priors are taken into account for the density computation.

Storage of the Resulting Model

The resulting model may be stored in association with a data set that the model represents. If the data is distributed among multiple devices, the resulting model may be distributed to the multiple devices for use at any of the devices. The distributed devices may use the resulting model to make predictions about the set of data without requiring a scan or analysis of individual records in the set of data.

Analysis of the set of data using the resulting model may include estimating how many rows will be eliminated by predicate(s) in a query, and/or how many rows will be fetched by a query after the application of the predicate(s).

The resulting model may also be used to create visualizations of data clusters. Because the resulting model approximates value distributions in the underlying data, the peaks and other clusters of data in the resulting model are likely to correspond with clusters of data in the underlying dataset.

The resulting model may be used in any situation that would otherwise require access to the underlying dataset, except in circumstances where exact determinations need to be made about the underlying dataset. The resulting model will often consume significantly less space to store and significantly less processor time and memory to analyze because the resulting model is merely a function that represents the underlying data and does not include the underlying data itself.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
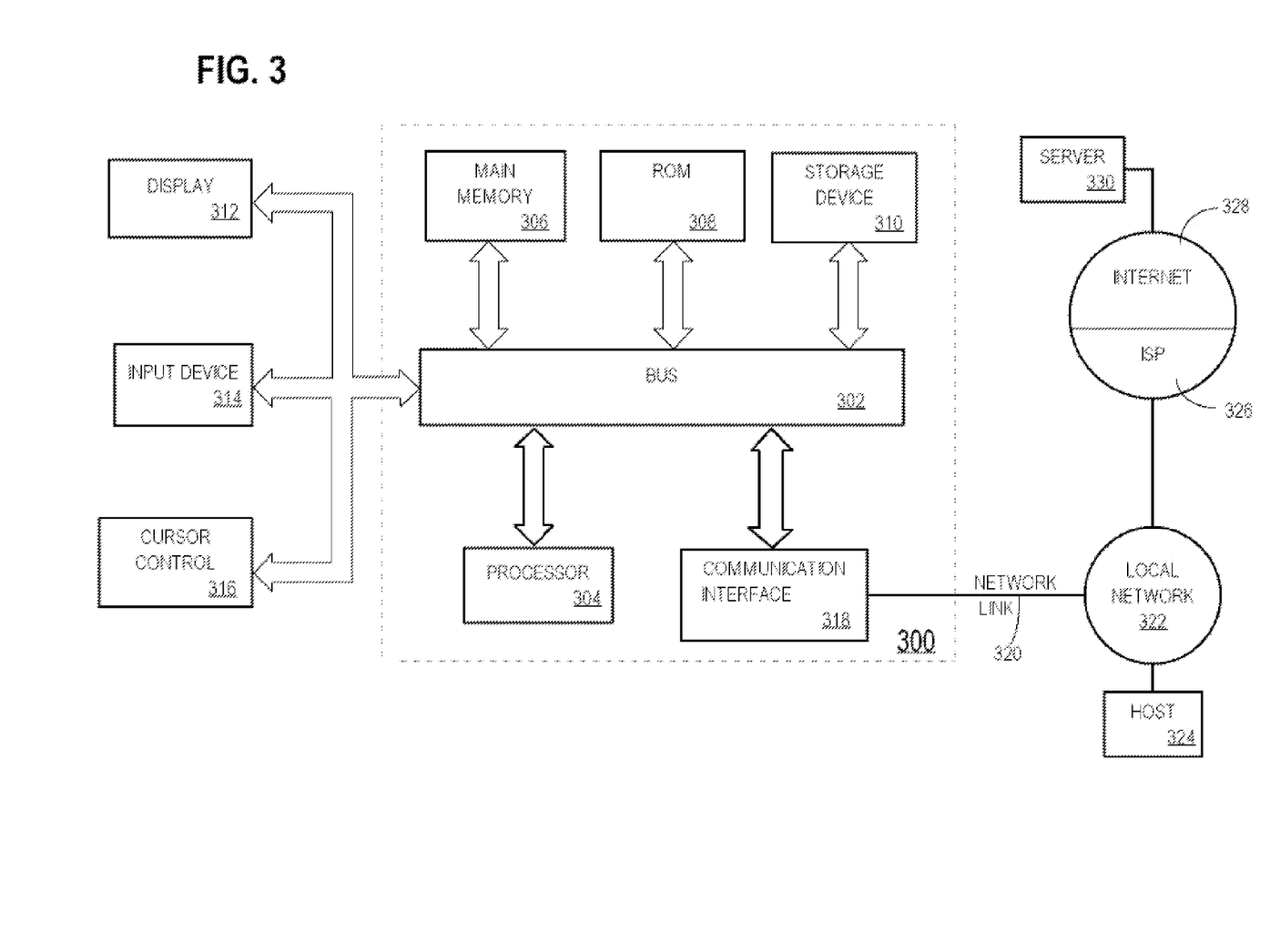
FIG. 3 illustrates an example computer system for performing various techniques described herein, such as the example process of FIG. 2.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

As used herein, the terms "first," "second," "third," "fourth," and "particular" are naming conventions that are used to introduce and reference members of a set of items. Unless otherwise expressly indicated, these terms are not intended to provide any ordering information about the members in the set. For example, a "first" item may or may not be at a beginning of a set of items, and may or may not be before a "second" item in the set, even if the set is referred to as a "list" or some other ordered arrangement of items.

To the extent that any steps are provided herein, an order that the steps are written is not necessarily an order that the steps are performed unless a later listed step is actually dependent on an earlier listed step or unless a particular ordering is expressly required. For example, a later listed step that uses or stores A may be dependent on an earlier listed step that receives or generates A but not necessarily on another earlier listed step that also uses or stores A. Therefore, the later listed step may be performed after one of the earlier listed steps but not necessarily after both of the earlier listed steps.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   estimating a number of rows that would be processed by each of one or more execution plans for a query based at least in part on a particular density model that approximates a weighted combination of at least a first density model for a first portion of a set of data and a second density model for a second portion of the set of data;
   based at least in part on the number of rows estimated for said each of one or more execution plans for the query, selecting an execution plan for the query;
   wherein the method is performed by one or more computing devices.

2. The method of claim 1, wherein the first portion is assigned to a first partition of the set of data based at least in part on one or more first key values in the first portion, and wherein the second portion is assigned to a second partition of the set of data based at least in part on one or more second key values in the second portion.

3. The method of claim 1, further comprising determining that the query, if executed, would access one or more rows from both the first portion and the second portion.

4. The method of claim 1, wherein the query is a first query, wherein the number of rows is a first number of rows estimated for said each of one or more execution plans for the first query, and wherein the selected execution plan is a first execution plan, further comprising:
   determining that a second query, if executed, would access one or more rows from the first portion but not the second portion;
   estimating a second number of rows that would be processed by each of one or more execution plans for the second query based at least in part on the first density model but not the second density model;
   based at least in part on the second number of rows estimated for said each of one or more execution plans for the second query, selecting a second execution plan for the second query.

5. The method of claim 1, further comprising generating the particular density model by approximating the weighted combination of at least the first density model and the second density model.

6. The method of claim 1, further comprising storing the particular density model in association with the set of data, wherein the particular density model specifies a weight that indicates how many data items are represented by the particular density model.

7. The method of claim 1, wherein estimating the number of rows uses the particular density model to estimate how many rows contain values that would satisfy at least one query predicate that filters rows based on values.

8. The method of claim 1, further comprising:
   generating a third density model at least in part by aggregating a first set of functional components of the first density model and a second set of functional components of the second density model based at least in part on a first weight of the first density model and a second weight of the second density model;
   wherein the particular density model approximates the third density model.

9. The method of claim 8, further comprising:
   generating the particular density model to approximate the third density model at least in part by:
      determining an initial set of functional components for the particular density model, wherein the initial set of functional components includes fewer components than the third density model;
      iteratively growing the initial set of functional components at least in part by:
         testing one or more additions of one or more functional components to the initial set of functional components; and
         determining whether the one or more additions improved an approximation of the third density model beyond a threshold level.

10. The method of claim 8, wherein the first density model is received from a first distributed system that stores the first portion of the set of data, wherein a second distributed system stores the second portion of the set of data, and wherein the method is performed without access to at least the first portion of the set of data.

11. The method of claim 1, further comprising receiving, by the one or more computing devices, the particular density model with an indication that the particular density model approximates values for the first portion of the set of data and the second portion of the set of data, and storing, by the one or more computing devices, the particular density model in association with the set of data; wherein at least some of the approximated values are stored on one or more other computing devices and not on the one or more computing devices.

12. The method of claim 1, wherein the set of data is a first column of a first table, and wherein estimating the number of rows is further based at least in part on one or more other density models that approximate value densities for one or more other columns of one or more tables.

13. One or more non-transitory storage media storing sequences of instructions which, when executed by one or more computing devices, cause:
   estimating a number of rows that would be processed by each of one or more execution plans for a query based at least in part on a particular density model that approximates a weighted combination of at least a first density model for a first portion of a set of data and a second density model for a second portion of the set of data;
   based at least in part on the number of rows estimated for said each of one or more execution plans for the query, selecting an execution plan for the query.

14. The one or more non-transitory storage media of claim 13, wherein the sequences of instructions include instructions that, when executed, cause assigning the first portion to a first partition of the set of data based at least in part on one or more first key values in the first portion, and assigning the second portion to a second partition of the set of data based at least in part on one or more second key values in the second portion.

15. The one or more non-transitory storage media of claim 13, wherein the sequences of instructions include instructions that, when executed, cause determining that the query, if executed, would access one or more rows from both the first portion and the second portion.

16. The one or more non-transitory storage media of claim 13, wherein the query is a first query, wherein the number of rows is a first number of rows estimated for said each of one or more execution plans for the query, and wherein the selected execution plan is a first execution plan, wherein the sequences of instructions include instruction that, when executed, cause:
    determining that a second query, if executed, would access one or more rows from the first portion but not the second portion;
    estimating a second number of rows that would be processed by each of one or more execution plans for the second query based at least in part on the first density model but not the second density model;
    based at least in part on the second number of rows estimated for said each of one or more execution plans for the second query, selecting a second execution plan for the second query.

17. The one or more non-transitory storage media of claim 13, wherein the sequences of instructions include instructions that, when executed, cause generating the particular density model by approximating the weighted combination of at least the first density model and the second density model.

18. The one or more non-transitory storage media of claim 13, wherein the sequences of instructions include instructions that, when executed, cause storing the particular density model in association with the set of data, wherein the particular density model specifies a weight that indicates how many data items are represented by the particular density model.

19. The one or more non-transitory storage media of claim 13, wherein estimating the number of rows comprises using the particular density model to estimate how many rows contain values that would satisfy at least one query predicate that filters rows based on values.

20. The one or more non-transitory storage media of claim 13, wherein the sequences of instructions include instructions that, when executed, cause:
    generating a third density model at least in part by aggregating a first set of functional components of the first density model and a second set of functional components of the second density model based at least in part on a first weight of the first density model and a second weight of the second density model;
    wherein the particular density model approximates the third density model.

21. The one or more non-transitory storage media of claim 20, wherein the sequences of instructions include instructions that, when executed, cause generating the particular density model to approximate the third density model at least in part by:
    determining an initial set of functional components for the particular density model, wherein the initial set of functional components includes fewer components than the third density model;
    iteratively growing the initial set of functional components at least in part by:
        testing one or more additions of one or more functional components to the initial set of functional components;
        determining whether the one or more additions improved an approximation of the third density model beyond a threshold level.

22. The one or more non-transitory storage media of claim 20, wherein the sequences of instructions include instructions that, when executed, cause receiving the first density model from a first distributed system that stores the first portion of the set of data, wherein a second distributed system stores the second portion of the set of data, and wherein the instructions are performed without access to at least the first portion of the set of data.

23. The one or more non-transitory storage media of claim 13, wherein the sequences of instructions include instructions that, when executed, cause receiving, by the one or more computing devices, the particular density model with an indication that the particular density model approximates values for the first portion of the set of data and the second portion of the set of data, and storing, by the one or more computing devices, the particular density model in association with the set of data; wherein at least some of the approximated values are stored on one or more other computing devices and not on the one or more computing devices.

24. The one or more non-transitory storage media of claim 13, wherein the set of data is a first column of a first table, and wherein estimating the number of rows is further based at least in part on one or more other density models that approximate value densities for one or more other columns of one or more tables.

* * * * *

UNITED STATES PATENT AND TRADEMARK OFFICE
CERTIFICATE OF CORRECTION

PATENT NO. : 9,110,949 B2
APPLICATION NO. : 13/764621
DATED : August 18, 2015
INVENTOR(S) : Milenova et al.

Page 1 of 1

It is certified that error appears in the above-identified patent and that said Letters Patent is hereby corrected as shown below:

Specification

In column 17, line 18, after "that" delete "do no" and insert -- do not --, therefor.

Claims

In column 23, line 12, in claim 16, after "include" delete "instruction" and insert -- instructions --, therefor.

Signed and Sealed this
Twenty-first Day of June, 2016

Michelle K. Lee
*Director of the United States Patent and Trademark Office*